United States Patent [19]

Harnsberger

[11] 4,120,359

[45] Oct. 17, 1978

[54] METHOD FOR FORMING A NON-DISSOLUBLE SAND CONTROL PACK AND A SAND CONTROL PACK MADE THEREBY

[75] Inventor: Bobby G. Harnsberger, Houston, Tex.

[73] Assignee: Texaco Inc., New York, N.Y.

[21] Appl. No.: 776,679

[22] Filed: Mar. 11, 1977

[51] Int. Cl.² .............................................. E21B 43/04
[52] U.S. Cl. .................................... 166/278; 166/280
[58] Field of Search .................................. 166/278, 280

[56] References Cited

U.S. PATENT DOCUMENTS

| 3,373,815 | 3/1968 | Kiel et al. | 166/280 |
| 3,780,807 | 12/1973 | Graham et al. | 166/280 |

OTHER PUBLICATIONS

"What is New in Gravel Packing," by Derry D. Sparlin, The Oil and Gas Journal, Dec. 16, 1974, pp. 56-60.

Primary Examiner—Ernest R. Purser
Attorney, Agent, or Firm—Carl G. Ries; Thomas H. Whaley; Theron H. Nichols

[57] ABSTRACT

The first step in a method for forming a high heat resistant, non-dissolvent sand control pack, as for resisting the high heat eroding and dissolving effects of steam flooding comprises (1) forming a slurry of gravel of silicon carbide alone, or with garnet or zircon mixed therewith. The high heat resistant unconsolidated, permeable, non-dissoluble, and long-life sand control pack consists of the granular material silicon carbide alone, or with garnet or zircon mixed therewith for resisting dissolving during steam flooding for minimizing migration of sand and other granular materials into the well bore from the production zone of hydrocarbon bearing formation.

10 Claims, 1 Drawing Figure

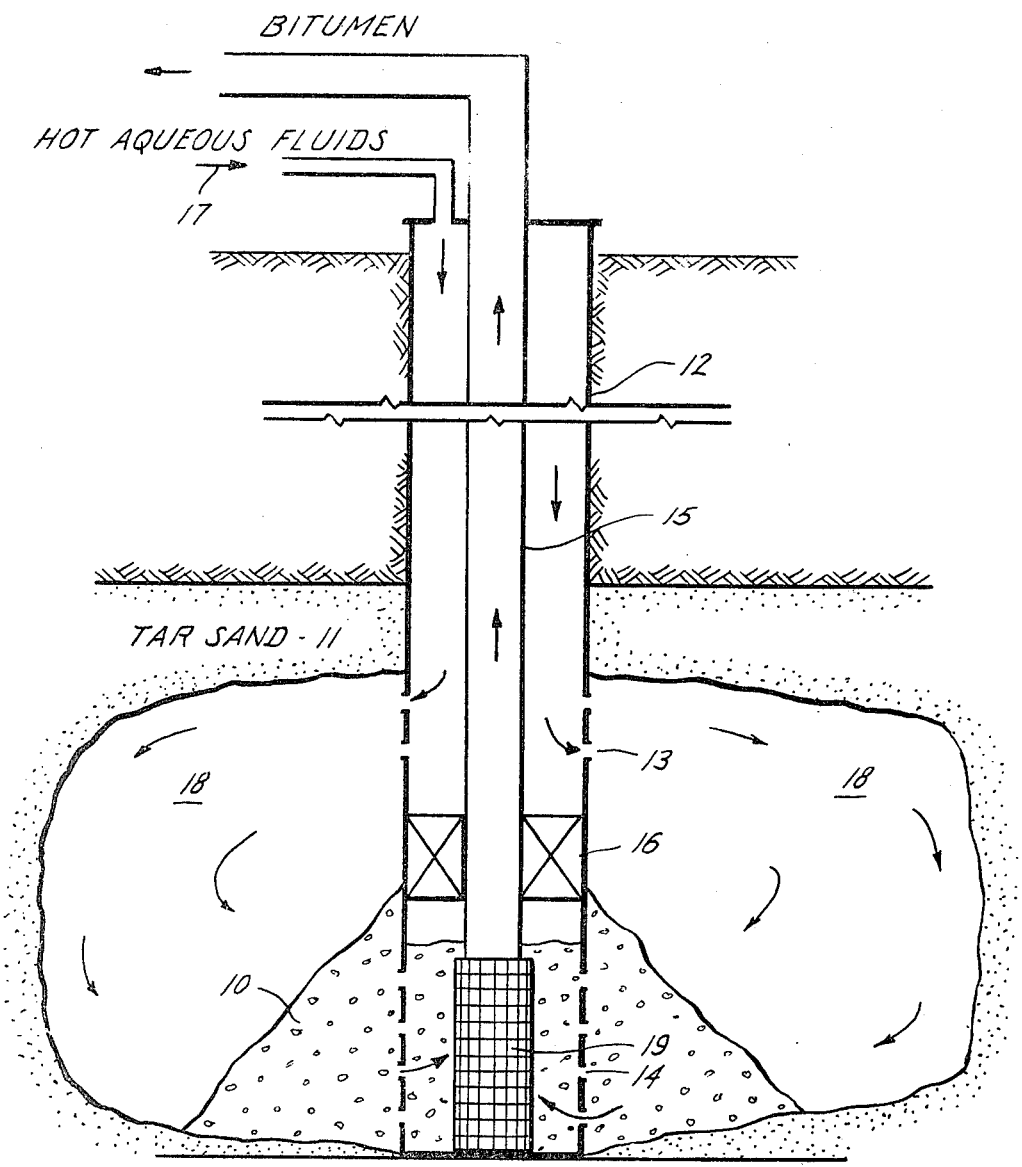

METHOD FOR FORMING A NON-DISSOLUBLE SAND CONTROL PACK AND A SAND CONTROL PACK MADE THEREBY

BACKGROUND OF THE INVENTION

1. Field of the Invention

This invention relates to an improved method of forming a sand control pack where steam injection is utilized and wherein a high heat resistant particulate material is injected as a slurry into the well to form a deposit against the wall of the well bore for forming an unconsolidated long life permeable sand control pack which is effective in preventing the gravel pack from being dissolved by the continuous flow of steam and in preventing the flow of fine particles from the formation into the well.

2. Prior Art and Background

Recovery of formation fluid such as petroleum from a subterranean formation is frequently difficult when the subterranean formation is comprised of one or more incompetent or unconsolidated sand layers or zones. The sand particles in the incompetent or unconsolidated sand zone move or migrate into the well bore during recovery of formation fluids from that zone, or sand particles move away from the well during injection of secondary or tertiary recovery fluids into the formation. In the instance of recovering the fluid from the formation, the movement of sand into the well bore can cause the well to cease production of fluids therefrom. Also, small sand particles can plug small openings and porous masses formed around the well bore for the purpose of restraining the flow of sand, such as screens or slotted liners which are frequently placed in wells for this purpose. Not only can fluid production be reduced or even stopped altogether, if sand particles flow through the well to the surface, considerable mechanical problems can result from passage of abrasive sand particles through pumps and other mechanical devices.

Many techniques have been described in the prior art for preventing or decreasing the flow of sand into well in a course of petroleum production, including the use of sand screens, filters, perforated or slotted liners, etc. around the well. These prior art attempts have been successful in some limited instances, but have not always been entirely satisfactory for a number of reasons. Mechanical devices usually restrain only the larger particle sand and are not completely effective for the purpose of restraining or preventing the flow of fine particles from the formation into the well and ultimately to the surface. Furthermore, the devices interfere with various types of completions and workover operations.

Recently, there have been introduced into the market place by numerous oil field companies, chemical compositions which bond the sand grains together with a resinous plastic material to form a permeable mass which effectively restrains the flow of sand particles from the formation. These methods involves injecting into a sand control pack around a well bore, a polymerizable, resinous material, which is later caused to polymerize so as to consolidate formation sand or sand packed around the well for that purpose, to form the desired permeable barrier. Numerous difficulties have been encountered in commercial application and use of this technique, including the difficulty of achieving the even polymerization of the resinous material to the degree necessary to consolidate the sand particles while still maintaining the necessary permeability so that petroleum or other fluid may pass therethrough. Furthermore, the resinous material are expensive. Another method comprises binding the sand grains together to form a porous mass as illustrated in Assignee's U.S. Pat. No. 3,910,351. This system likewise is expensive. Recently, many tertiary recovery techniques involving the injection of steam or other fluids into the formation for the purpose of mobilizing viscous petroleum, and this has imposed a still greater burden on sand consolidation techniques, and has particularly caused problems with the plastic consolidation techniques which are sensitive to the high temperature, high pH aqueous fluids frequently employed in such processes. The resinous materials and the sand control pack are frequently dissolved or degraded by contact with the hot alkaline fluids used in tertiary recovery processes.

Serious problems have been encountered in attempting to use conventional sand control packs in conjunction with tertiary recovery techniques involving steam injection. Where the high temperature steam or hot water under high flow rates contacts the sand control packs, it has been found that such packs are quickly eroded away or dissolved and must therefore be replaced at frequent intervals.

There is need in the art therefore for a sand control pack which when employed, for example, in wells utilized in steam or hot water flooding operations, will have a long operating life.

SUMMARY OF THE INVENTION

The pack of solid particulate matter of this invention may be formed in a variety of ways. Generally a minor amount of the formation adjacent that section of the well to be treated is removed by washing with hot water as in the case of a tar sand formation or other suitable fluid or by under-reaming to form a small cavity in the immediate vicinity of the well bore. After a suitable amount of material has been removed the tubing string and/or other well hardware is placed in the well, following which the new heat resistant gravel is introduced into the well bore opposite the petroliferous formation. This new sand control particulate material comprises silicon carbide, garnet, zircon, or mixtures thereof. Thus, this method and sand control pack made by the method is an improvement over my above identified prior invention.

OBJECTS OF THE INVENTION

A primary object of this invention is to proviee a method for forming a sand control pack comprising silicon carbide, garnet, zircon, or mixtures thereof for resisting dissolving due to steam flooding.

Another primary object of this invention is to provide a sand control pack that will resist melting or dissolving due to high heat values and that will resist the action of hot water having a high pH value.

A further object of this invention is to provide a method and a sand control pack made thereby that is easy to operate, is of simple configuration, is economical to form, and is of greater efficiency for the filtering of sand from produced liquids in a well.

Other objects and various advantages of the disclosed method for forming a high heat resistant, nondissolvent sand control pack and a long-life pack made thereby will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, one sand control pack of the invention wherein like reference numerals designate corresponding parts in the several views in which:

The FIGURE is a schematic diagrammatic sectional view of an examplary producing well having the new long-life sand control pack in the lower end thereof for filtering sand and other foreign material from the bitumen for recovering the bitumen at the surface.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF NEW SAND CONTROL

While various sand control packs may be formed from the subsequently disclosed methods and while the methods set forth hereinafter may form other packs, the FIGURE illustrates at least one inventive sand control pack formed by at least one of the following methods.

A sand control pack 10 is illustrated in the FIGURE and is formed around the base of a casing 12 protruding into a subterranean petroliferous formation 11 or reservoir, such as one including tar sands from which bitumen may be melted out with the application of heat. While this invention may be formed by methods similar to but patentably different from methods for forming many conventional sand control packs, in this case the casing 12 has upper perforations 13 and lower perforations 14 through which a hot fluid 17 may flow in the annulus formed between the casing 12 and tubing 15 first to form the cavity 18 and next through which the granular, solid, particulate material is passed to stack up against the lower end of the casing 15, its lower perforations 14, and a screen 19 on the lower end of tubing 15. A packer 16 is positioned in the annulus between the upper and lower perforations. More details of this particular sand control pack are set forth in my copending patent application Ser. No. 716,503, filed Aug. 23, 1976, now U.S. Pat. No. 4,066,127, over which this sand control pack is an improvement.

The improvement of the sand control pack of this invention over that in my above identified patent application is that the granular, solid, particulate material of this sand control pack consists of silicon carbide, garnet, zircon, or mixtures thereof.

| LABORATORY TEST RESULTS |||||
|---|---|---|---|---|
| Steam Temperature - 490° F. (254.4° C.) Steam Pressure - 500 psig (34.6 Kg./cm²) (60-80% quality, water phase pH 10-11) |||||
| Test | Materials | Mesh Size | Time | % Wt. Loss |
| A. | Sand | 70-170 | 20 hours | 58% |
| B. | Silicon Carbide | 42-70 | 21 days | 0% |
| C. | Garnet | 40-60 | 17 days | 1.07% |
| D. | Zircon | 20-60 | 41 days | 0.92% |

It may be noted that while 58% loss in weight occurred in the sand sample due to dissolving after only 20 hours exposure to steam at a temperature of at least 490° F. and a pressure of 500 psig, the silicon carbide sample sustained no loss of weight after 21 days of exposure to the steam, the garnet sample sustained the negligible weight loss of 1.07% after 17 days of steam exposure, and the Zircon sample sustained the negligible weight loss of 0.92% after 41 days of steam exposure.

TEST A

A sample sand control pack of sand having a mesh size of 70 to 170 was weighed and placed in a high pressure test cell. Next, 500 psig (pounds per square inch gauge) steam (60-80% quality with a water phase pH of 10-11) was passed through the pack for 20 hours. At the end of this period the sand pack was weighed. It has lost 58% of the original weight. This was due to dissolving of the sand.

TEST B

A sample sand control pack of silicon carbide having a mesh size of 42 to 70 was weighed and placed in the high pressure test cell. Then, 500 psig steam (60-80% quality with a water phase pH of 10-11) was passed through the pack for 21 days. At the end of this period no loss of weight was detected.

TEST C

A sample sand control pack of garnet having a mesh size of 40 to 60 was weighted and placed in the high pressure test cell. Next 500 psig steam (60-80% quality with a water phase pH of 10-11) was passed through the pack for 17 days. After a second weighing, a loss in weight of 1.07% was measured.

TEST D

A sample sand control pack of zircon having a mesh size of 20 to 60 was weighed and placed in the high pressure test call. Then 500 psig steam (60-80% quality with a water phase pH of 10-11) was passed through the pack for 41 days. After a last weighing a loss in weight of 0.92% was measured.

From the above tests, it was concluded that any mixtures of silicon, carbide, garnet, or zircon would likewise form a sand control pack that was highly resistant to dissolving due to long sustained exposure to high temperatures, and particularly resistant to steam under a high pressure and at high pH values.

Accordingly sand control packs formed of silicon carbide, garnet, zircon, and any mixture thereof have been shown to be dissolvent resistant and resistant to high heat, high pressures, and high pH values, and thus shown to have a long life in the well bore.

METHODS FOR FORMING A HIGH HEAT RESISTANT NON-DISSOLUBLE SAND CONTROL PACK

While other methods may be utilized to form the above described sand control pack, the methods disclosed below are examplary preferred ones.

In one suitable method of introducing the solid particulate matter into the well, a slurry of the granular material in water, oil, or some other suitable fluid is formed and pumped into the well bore. In this case, the thus-formed slurry is pumped down the annulus between the well tubing and the well casing, through the bottom of the annulus and then through perforations such as slots or other openings in the closed-end tubing which extends below the casing to a location opposite the permeable zone. The perforations in the tubing are selected so that the solid particulate material is filtered from the slurry as it enters the tubing from which the carrier liquid is removed to the surface by pumping. Simultaneously the slurry is forced into the formation and the solid particulate material contained is filtered out against the formation face. The granular or particulate materials thus removed from the slurry form the pack consisting essentially of silicon carbide, garnet, or zircon particulate material tightly packed together which form an unconsolidated permeable long-life sand control pack resistant to dissolving due to continued flow of steam from steam injection.

Further, in another procedure similar to one disclosed in inventor's above identified patent the casing which extends through the permeable production zone is perforated near the top and again near the bottom of the producing zone after which a tubing string having a wall screen or perforated liner attached to it at the end is run, and the screen or liner is positioned opposite the lower set of perforations. Then a packer is set between the two sets of perforations. Slurry containing the solid particulate, granular matter, which in this case is silicon garbide, garnet, zircon, or mixtures thereof, is pumped down the annulus between the casing and the tubing out of the upper set of perforations, through the previously formed cavity outside the casing opposite the perforations then back through the lower set of perforations and finally through the screen. The particulate granular material is filtered out of the slurry against the lower set of perforations, the screen, and against the formation face. The thus-formed sand control pack comprises silicon carbide, garnet, zircon, or mixtures thereof to form an unconsolidated, permeable long-life sand control pack resistant to the dissolving effect of very hot fluids such as continuous steam injection.

One method is illustrated in the FIGURE for forming a gravel pack 10 which is especially useful in connection with the production of heavy hydrocarbons from, for example, tar sands 11 in the FIGURE in which a heavy oil or tar is the matrix and sand or other solids are suspended in the oil, the casing 12 is set through the production zone 11 and perforated at the top with perforations 13 and at the bottom with perforations 14 following which tubing 15 is run into the casing to a depth so that a packer 16 may be set between the sets of perforations and the tail pipe extended below the lowest perforations. After the packer 16 is set steam or hot water 17 is forced down the casing, out of the upper perforations 13, back through the lower perforations 14 and finally out of the tubing 15. Circulation is continued until a cavity 18 of the desired size is washed or melted out of the formation. In the next step the tubing and packer would be pulled and tubing having a packed off screen 19 at the end thereof is run and set with the screen opposite the lower perforations and a packer between the two sets of perforations. A slurry of the new, high heat resistant particulate packing material comprising silicon carbide, garnet, zircon, or mixtures thereof in water/oil or any other suitable fluid is pumped down the annulus between the casing 12 and tubing 15, out through the upper casing perforations 13 and then back through the lower casing perforations 14 and against the screen wall 19 which filters out the particulate material while the carrying fluid passes through the screen and flows back to the surface via the tubing string. As the new particulate material is filtered out it gradually builds up in the cavity 18 previously formed and when the amount of filtered out material is sufficient to cover the lower perforations, the introduction of the slurry is stopped. Simultaneously during the injection phase, the slurry may be forced out into the formation and particulate material thus is filtered out against the formation face and and also contributes to the filling of the previously formed cavity. The thus newly formed sand control pack 10 is heat and dissolvent resistant to form an unconsolidated, permeable and long life sand control pack 10. More details of the steps of the above method are disclosed in my above identified prior invention.

In the process of this invention the mesh size of the silicon carbide, garnet, or zircon sand or gravel injected into the well bore will vary in size from about 20 to about 100 mesh and preferably will be from about 20 to about 80 mesh size. Usually the amount of gravel present in the slurry will contain from about ½ to about 10 pounds per gallon of the carrier fluid and preferably this amount will be from about 1 to about 25 pounds per gallon.

A wide variety of carrier fluids can be employed in preparing the slurry of the silicon carbide, garnet, or zircon granular material employed in this invention including fresh water, brine, hydrocarbon oils including crude oil, kerosene, etc. Since it is required that the carried fluid have sufficient viscosity to maintain the high temperature resistant sand or gravel in a suspension, it may be necessary to add a gelling agent. Oil-base fluids soaps, such as napolin, may be utilized and with water base fluids, guar gum is a highly satisfactory gelling agent.

The silicon carbide, garnet, or zircon granular particles employed in this invention can be prepared by a variety of methods such as those methods well known in the art.

When the sand control pack is formed of silicon carbide, garnet, zircon, or mixtures thereof, the resulting unconsolidated long-life, non-dissoluble sand control pack is not affected by the injection of high temperature and high pH fluids such as often present in hot water, steam or super-heated steam.

The present invention avoids any undesirable delays in the inauguration of a supplemental recovery technique involving the injection of an aqueous fluid, since no reaction time is involved in forming the desired silicon carbide, garnet, or zircon granular particles. Injection of fluid, even very hot aqueous fluids, can be initiated immediately after setting or forming of the sand control pack.

While the sand control packs discussed and illustrated herein pertain to new and different ones invented by the instant inventor, practically any conventional gravel pack may be used in inventor's new method or sand control pack by utilizing inventor's new solid granular materials, i.e, Silicon Carbide, Garnet, Zircon, or mixtures thereof.

Thus, accordingly, it will be seen that the present methods and sand control packs made by the methods are shown to operate in a manner which meets each of the objects set forth hereinbefore.

While only a few sand control packs and a few methods for making the sand control packs of the invention have been disclosed, it will be evident that various modifications are possible in the arrangement, construction, and methods of the disclosed invention without departing from the scope of the invention, and it is accordingly desired to comprehend within the purview of this invention such modifications and methods as may be considered to fall within the scope of the appended claims.

I claim:

1. A method for forming a pack of solid particulate material for resisting the deteriorating and dissolving effect of continuous hot steam flooding in a well bore for penetrating a petroliferous formation comprises,
    (a) selecting a granular material that is resistant to solubility at the temperatures of hot steam of silicon carbide,
    (b) mixing a slurry of the granular silicon carbide material, and
    (c) injecting the slurry of insoluble unconsolidated granular silicon carbide material into the well bore opposite the permeable formation to create a permeable pack of particulate material against the formation face thereby minimizing migration of sand and other formation particles into the well bore from the formation and particularly for resisting continuous high heat exposure, as from the steam flooding.

2. A method as recited in claim 1 wherein,
    (a) the material of the first two method steps comprises a mixture of silicon carbide, garnet, and zircon.

3. A method as recited in claim 1 wherein,
    (a) the material of the first two method steps comprises a mixture of silicon carbide and garnet.

4. A method as recited in claim 1 wherein,
    (a) the material of the first two method steps comprises silicon carbide and zircon.

5. A method as recited in claim 1 wherein,
    (a) the material of the first two method steps has a solubility that ensures less than 1.07% weight loss in 17 days from injection of 490° F. steam.

6. A non-dissoluble, sand control pack that will resist high heat exposure from continuous hot steam flooding comprises,
    (a) a granular material of silicon carbide, garnet, zircon.

7. A sand control pack for resisting high heat sources as recited in claim 6 wherein,
    (a) said material is a mixture of silicon carbide, garnet, and zircon.

8. A sand control pack for resisting high heat sources as recited in claim 6 wherein,
    (a) said material is a mixture of silicon carbide and garnet.

9. A sand control pack for resisting high heat exposures as recited in claim 6 wherein,
    (a) said material is a mixture of silicon carbide and zircon.

10. A sand control pack for resisting high heat sources as recited in claim 6 wherein,
    (a) said material has a solubility that ensures less than 1.07% weight loss in 17 days from injection of 490° F. steam.

* * * * *